(12) United States Patent
Murase et al.

(10) Patent No.: US 9,044,952 B2
(45) Date of Patent: Jun. 2, 2015

(54) RECORDING APPARATUS AND RECORDING SYSTEM

(71) Applicant: CANON KABUSHIKI KAISHA, Tokyo (JP)

(72) Inventors: Takeshi Murase, Yokohama (JP); Masao Kato, Kawasaki (JP); Shigeyasu Nagoshi, Yokohama (JP); Minako Kato, Kawasaki (JP); Minoru Teshigawara, Saitama (JP); Yoshiaki Murayama, Tokyo (JP); Susumu Hirosawa, Tokyo (JP); Yutaka Kano, Yokohama (JP); Satoshi Azuma, Kawasaki (JP); Kentarou Muro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/098,288

(22) Filed: Dec. 5, 2013

(65) Prior Publication Data
US 2014/0092164 A1    Apr. 3, 2014

Related U.S. Application Data

(63) Continuation of application No. 12/964,174, filed on Dec. 9, 2010, now Pat. No. 8,628,164.

(30) Foreign Application Priority Data

Nov. 10, 2010    (JP) .................................. 2010-251904

(51) Int. Cl.
*B41J 29/393*    (2006.01)
*B41J 2/165*    (2006.01)
*B41J 2/045*    (2006.01)
*B41J 2/21*    (2006.01)
*H04N 1/00*    (2006.01)

(52) U.S. Cl.
CPC ............ *B41J 2/16579* (2013.01); *B41J 2/0451* (2013.01); *B41J 2/2139* (2013.01); *B41J 2/2142* (2013.01); *H04N 1/00015* (2013.01); *H04N 1/00037* (2013.01); *H04N 1/00063* (2013.01); *H04N 1/00087* (2013.01)

(58) Field of Classification Search
CPC ...... B41J 2/0451; B41J 2/2139; B41J 2/2142; B41J 2/16579
See application file for complete search history.

(56) References Cited

U.S. PATENT DOCUMENTS 7,088,471 B2 *    8/2006    Marumoto et al.

\* cited by examiner

*Primary Examiner* — Julian Huffman
(74) *Attorney, Agent, or Firm* — Canon USA, Inc., IP Division

(57) ABSTRACT

A process of detecting a defective recording element and a process of correcting the defective recording element are performed with appropriate processing loads. When the detection process and the correction processes are performed with small loads, for example, at a time of recording, a resolution used for reading an inspection pattern is set lower than that set in a case where the processes can be performed with small loads, for example, at down time before recording. The reading resolution to be set may be determined by an apparatus in accordance with a processing load or may be arbitrarily determined by a user.

11 Claims, 13 Drawing Sheets

RECORDING APPARATUS AND RECORDING SYSTEM

CROSS REFERENCE TO RELATED APPLICATIONS

The present application is a continuation of U.S. patent application Ser. No. 12/964,174, filed on Dec. 9, 2010, which claims priority from Japanese Patent Application No. 2010-251904, filed Nov. 10, 2010, all of which are hereby incorporated by reference herein in their entirety.

BACKGROUND OF THE INVENTION

1. Field of the Invention

The present invention relates to a process of detecting a defective recording element, and a recording apparatus capable of executing a correction process performed when data to be recorded by a defective recording element is recorded by recording elements other than the defective recording element, and a recording system.

2. Description of the Related Art

In general, a technique of suppressing occurrence of printing failure at the minimum has been proposed in order to strike a balance between high image quality and low running cost. For example, Japanese Patent Laid-Open No. 2008-62516 discloses a method for simultaneously performing printing and detection of a defective ejection nozzle in a serial printer and performing correction of the defective nozzle in the next scanning when the defective ejection nozzle is detected. Furthermore, Japanese Patent Laid-Open No. 2005-225037 discloses a method for visually detecting a defective portion by an operator and correcting a continuous region including the defective portion in order to reduce a load of a process of detecting and correcting a defective ejection nozzle.

However, in the technique disclosed in Japanese Patent Laid-Open No. 2008-62516, a load applied to the process of detecting and correcting a defective nozzle is large. Therefore, there arises a problem in that high information processing capability and a long period of time are required for the process. Accordingly, even when a long period of time should not be given to perform the process, the process takes a long period of time. Accordingly, productivity is lowered. Furthermore, in the technique disclosed in Japanese Patent Laid-Open No. 2005-225037, since the operator or a user visually detects a defective portion, a long period of time is required for the process and a load applied to the user is heavy.

SUMMARY OF THE INVENTION

The present invention provides a recording apparatus capable of appropriately executing a process of detecting a defect of a recording element and a process of correcting the recording element depending on a situation including accuracy of the processes and a period of time allowed to be used for the processes which are required by the user.

According to an embodiment of the present invention, there is provided a recording apparatus which records an image in a recording medium using a recording unit including recording element arrays each of which has a plurality of recording elements which are arranged. The recording apparatus includes a reading unit configured to read an inspection pattern used to detect a defective recording element included in the plurality of recording elements with a first resolution and a second resolution which is lower than the first resolution, a determination unit configured to determine, when the reading unit reads the inspection pattern with the first resolution, whether the defective recording element is included in accordance with a result of the reading, and determine, when the reading unit reads the inspection pattern with the second resolution, whether the defective recording element is included in accordance with a result of the reading in a unit of a recording element group including a plurality of recording elements, and a generation unit configured to generate data of an image to be recorded in accordance with a result of the determination made by the determination unit. When the reading unit performs the reading with the first resolution, the generation unit generates data so that an image to be recorded using the defective recording element determined by the determination unit is recorded using recording elements other than the defective recording element in a compensation manner whereas when the reading unit performs the reading with the second resolution, the generation unit generates data so that an image to be recorded using the recording element group including the defective recording element determined by the determination unit is recorded using recording elements other than the recording elements included in the recording element group in a compensation manner.

Accordingly, a process of detecting a defective recording element and a process of correcting the defective recording element can be performed with appropriate loads, and degradation of image quality can be suppressed.

Further features of the present invention will become apparent from the following description of exemplary embodiments with reference to the attached drawings.

DESCRIPTION OF THE EMBODIMENTS

First Embodiment

Figure 1A:
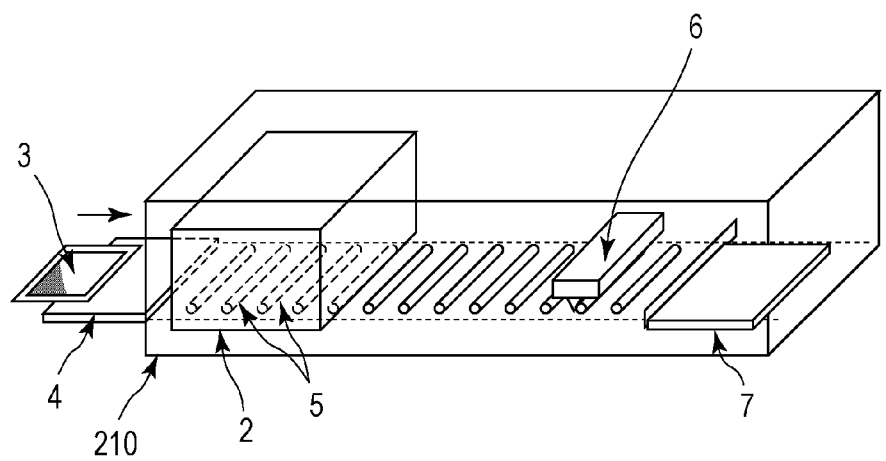
FIGS. 1A and 1B are diagrams schematically illustrating an inkjet printer.

An embodiment of the present invention will be described hereinafter with reference to the accompanying drawings. Note that components having the same functions are denoted by the same reference numerals and redundant descriptions thereof are omitted.

Configuration of Apparatus

FIG. 1A is a diagram schematically illustrating an inkjet printer 210 serving as a printing apparatus according to a first embodiment. When the inkjet printer 210 performs normal printing, a recording medium 3 fed from a sheet-feeding tray 4 is conveyed by rotations of a plurality of conveying rollers 5 disposed on upper and lower portions. The recording medium 3 is supplied from left to right as denoted by an arrow mark shown in FIG. 1A. Subsequently, a recording head 2 serving as a recording unit performs printing and the recording medium 3 is discharged to a sheet-ejection tray 7. In this inkjet printer 210, a defective nozzle included in the recording head 2 is detected so that appropriate quality of a printed image is attained. In this case, a printed sheet, i.e., the recording medium 3 which is printed using the recording head 2 is read by a reading unit 6 so that a defective nozzle is detected. In this embodiment, the reading unit 6 corresponds to a CCD camera 211 or a scanner 212, which will be described hereinafter.

Figure 1B:
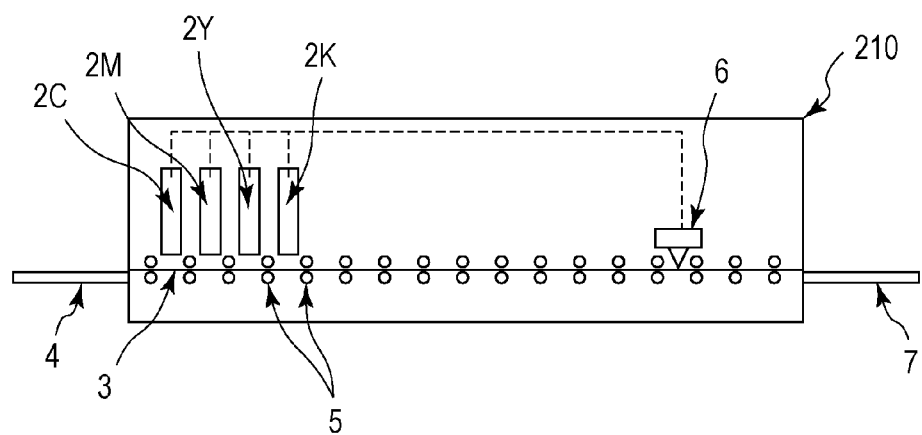

FIG. 1B is a sectional view illustrating the inkjet printer 210 sectioned in a direction in which the recording medium 3 is supplied (sub-scanning direction). An image read by the reading unit 6 is analyzed by a CPU 201 serving as a controller of an image processing apparatus 200 which will be described hereinafter so that a defective nozzle is detected. The recording head 2 of this embodiment is capable of performing printing using four color inks including C (cyan), M (magenta), Y (yellow), and K (black) and includes four heads including heads 2C, 2M, 2Y, and 2K.

Figure 4:
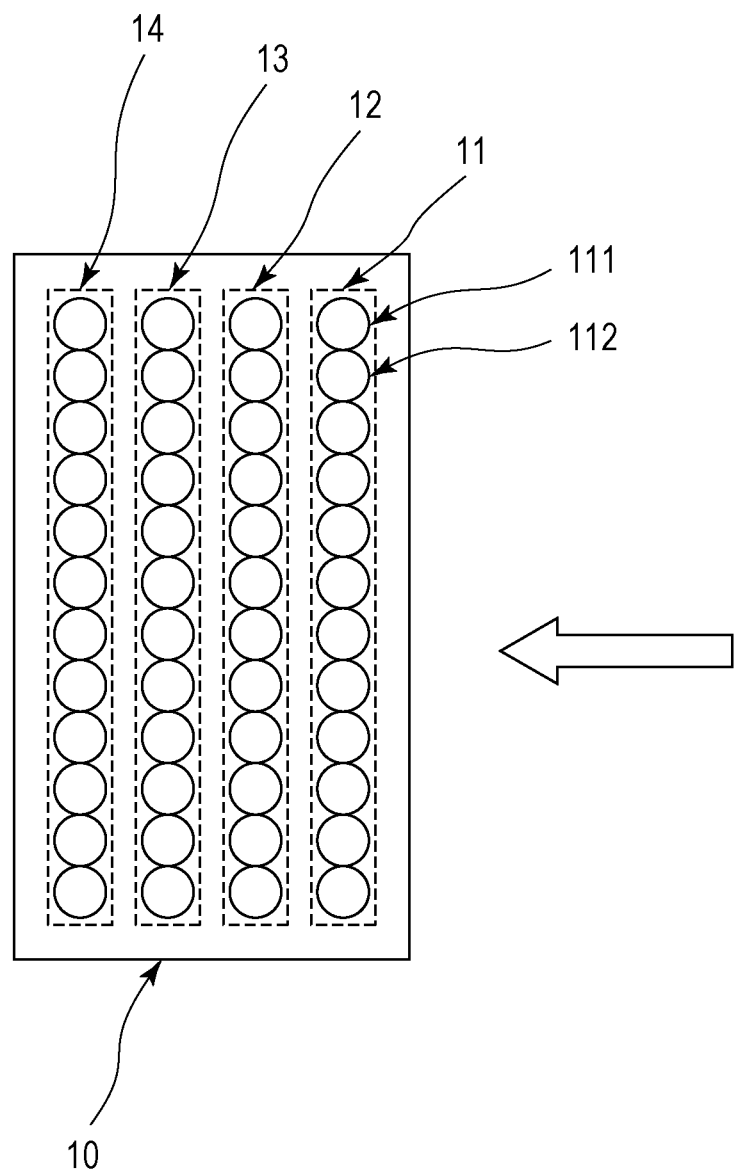
FIG. 4 is a diagram illustrating an ejection port surface of a recording head.
Figure 5:
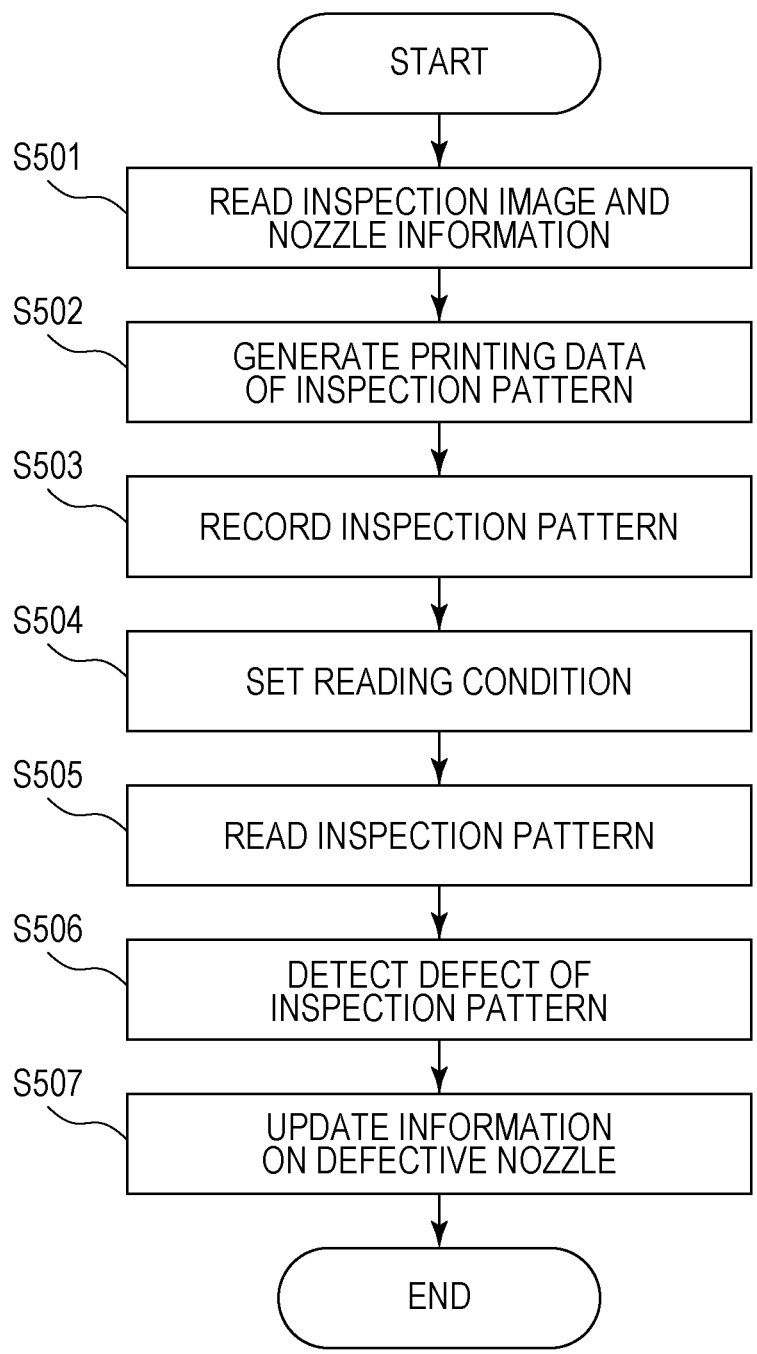
FIG. 5 is a flowchart illustrating a first detection process.

FIG. 4 is a diagram illustrating an ejection port surface 10 of the recording head 2. FIG. 4 shows an example of one of the recording heads 2C, 2M, 2Y, and 2K which eject the corresponding color inks described with reference to FIG. 1B. A direction denoted by an arrow mark in FIG. 4 corresponds to the direction in which the recording medium 3 is conveyed. Four arrays of nozzles (nozzle arrays 11 to 14) serving as recording elements corresponding to the same ink color are arranged in the supplying direction. Then, each of the nozzle arrays serving as recording element arrays includes nozzles arranged in a direction orthogonal to the supplying direction in a unit of 600 dpi. The nozzle array 11 includes nozzles 111, 112, and so on starting from an upper portion of the drawing. Each of the nozzle arrays includes a first nozzle, a second nozzle, and so on.

Note that, although the printer using the four color inks, i.e., C, M, Y, and K, is taken as an example in this embodiment, the present invention is not limited to these ink colors and many ink colors including light cyan, light magenta, light gray, red, and green may be used. Furthermore, in order to prevent complication of description, an image used to inspect states of nozzles serving as the recording elements is referred to as an inspection image, a result of printing of the inspection image is referred to as an inspection pattern, an image to be printed such as a photograph is referred to as a target image, and an image obtained by printing the target image is referred to as an actual image. Furthermore, a process described below is simultaneously or separately performed for individual ink colors. Inspection patterns of all ink colors may be integrally printed.

Figure 2:
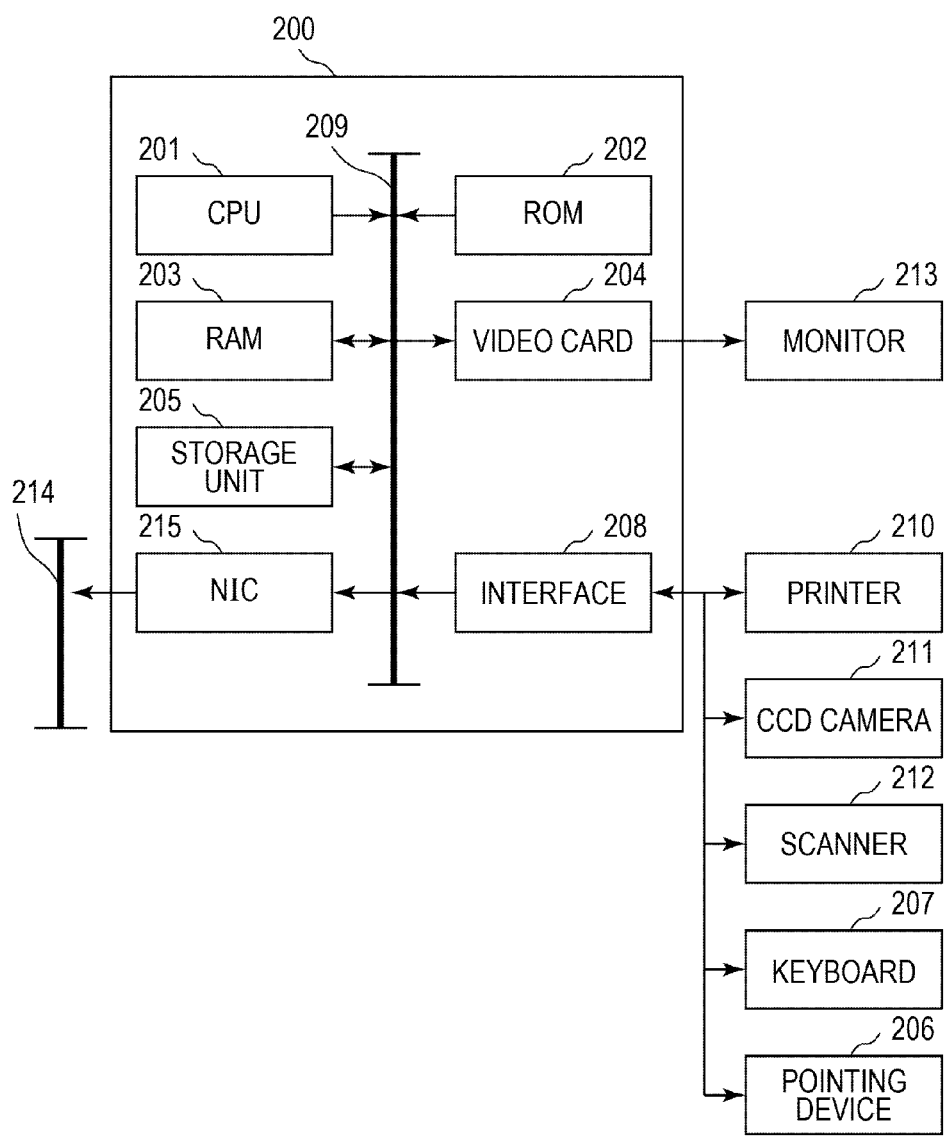
FIG. 2 is a block diagram illustrating a system of an information processing apparatus.

FIG. 2 is a block diagram illustrating a configuration of a system according to this embodiment. The image processing apparatus 200 includes the CPU 201, a ROM 202, a RAM 203, and a video card 204 which is connected to a monitor 213 (which may include a touch panel). The image processing apparatus 200 further includes a storage unit 205 such as a hard disk drive or a memory card which serves as a storage region. The image processing apparatus 200 further includes an interface 208 for a serial bus of a USB or the IEEE1394 standard which is connected to a pointing device 206 such as a mouse, a stylus, or a tablet and a keyboard 207. The image processing apparatus 200 further includes a network interface card (NIC) 215 connected to a network 214. In this configuration, the components are connected to one another through a system bus 209. Furthermore, the printer 210, the CCD camera 211, and the scanner 212 may be connected to the interface 208. Moreover, image data may be input by an apparatus which optically obtains image data such as a digital still camera or a digital video camera or may be input by a portable medium such as a magnetic disk, an optical disc, or a memory card. The image data to be input may be included in an image file. The CPU 201 loads a program (including an image processing program which will be described hereinafter) stored in the ROM 202 or the storage unit 205 into the RAM 203 serving as a work memory and executes the program. Thereafter, the CPU 201 controls the components described above through the system bus 209 in accordance with the program to thereby realize a function of the program. Furthermore, the memories such as the ROM 202 and the RAM 203 and the storage device such as the storage unit 205 include information representing a state of the recording head 2. Any information serves as this information as long as the information represents states of nozzles.

Characteristic Configuration

A characteristic configuration of this embodiment will be described hereinafter with reference to FIGS. 3 to 8. As described above, in the present invention, a process of detecting a defective nozzle which is a defective recording element and a process of correcting a defective nozzle which is a defective recording element are appropriately executable depending on a situation. Specifically, a mode in which a defective nozzle is detected on a nozzle-by-nozzle basis and a correction is performed with high accuracy or a mode in which a detection of a region including a defective nozzle and a correction process performed on the region are executed with a small processing load or within a short period of time is selected and executed. Although described hereinafter, in this embodiment, the CPU 201 serving as the controller included in the recording apparatus determines one of the modes to be selected. However, a determination as to whether a correction is performed with high accuracy or performed with a small load or within a short period of time may be performed where appropriate, and the user may freely make the determination. When the user makes the determination, an instruction issued by the user is received and a reading resolution is determined in accordance with the instruction. Then, an inspection pattern is read in accordance with the determined reading resolution. In accordance with a result of the reading, recording data is assigned to non-defective nozzles so as to be recorded by the non-defective nozzles.

Figure 3:
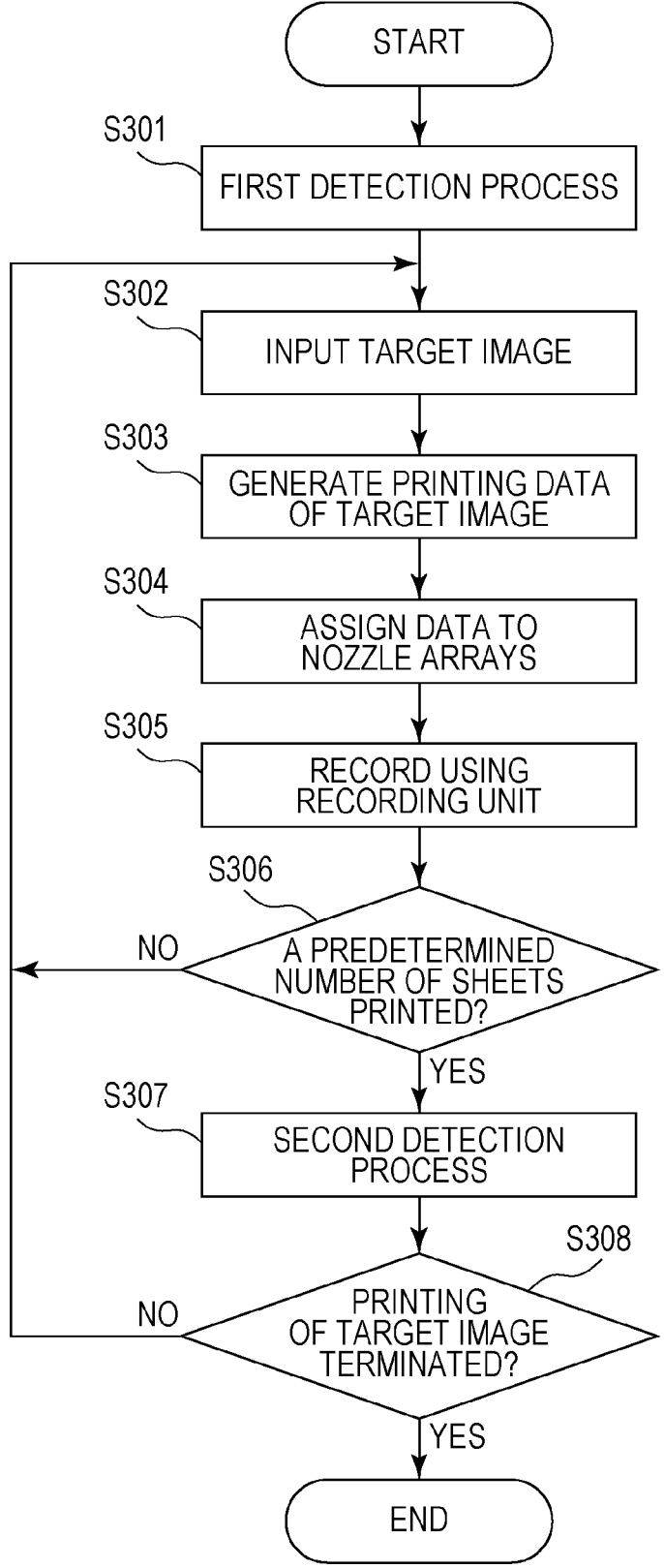
FIG. 3 is a flowchart illustrating a process according to a first embodiment.

FIG. 3 is a flowchart illustrating a series of sequences of the defective nozzle detection process and the defective nozzle correction process according to this embodiment. First, a flow of the series of the processes will be described. Before printing, as maintenance of the apparatus, an inspection pattern is printed in order to detect a defective nozzle. In this embodiment, since a correction is performed with high accuracy in the maintenance before printing, detection of a defective nozzle is performed on a nozzle-by-nozzle basis. Then, the correction process is performed so as to prevent a defective image from being generated due to a detected defective nozzle, and thereafter, printing of an actual image is started. After a predetermined number of actual images are printed, the inspection pattern is printed again. In this embodiment, the inspection pattern is printed among operations of printing actual images so that a defective nozzle is detected. In this case, detection of a defective nozzle is performed in a unit of a nozzle group which includes a plurality of nozzles in order to reduce a load of the detection process and the correction process. Then, the correction process is performed on the detected defective nozzle group, and thereafter, the actual image is printed again. Hereinafter, these processes will be described in detail.

In step S301, a first detection process is performed before printing of an actual image. In the first detection process, detection of a defective ejection nozzle is performed on a nozzle-by-nozzle basis. The first detection process will be described in detail with reference to a flowchart shown in FIG. 5.

First Detection Process

Figure 6:
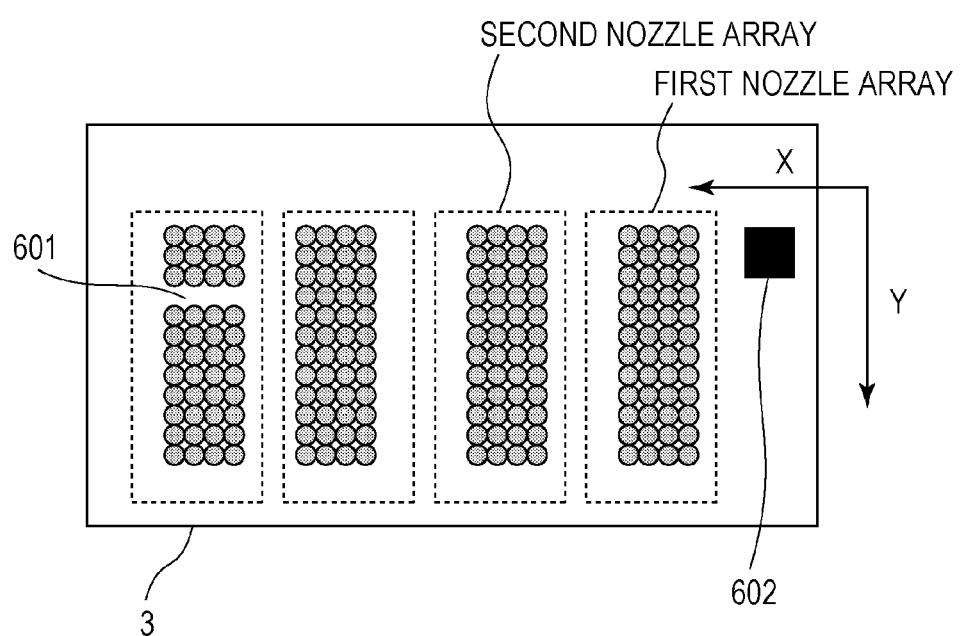
FIG. 6 is a diagram illustrating an inspection pattern of the first detection process.

In step S501, an inspection image and information on a nozzle state are read. In this embodiment, the inspection image and the information on a nozzle state have been stored in the ROM 202. In step S502, printing data of an inspection pattern is generated in accordance with the inspection image and the information on a nozzle state read in step S501. In step S503, the printing data generated in step S502 is printed. FIG. 6 is a diagram illustrating the inspection pattern of the first detection process. In FIG. 6, a horizontal direction corresponds to an X axis and a vertical direction corresponds to a Y axis. The inspection pattern is obtained such that each of the nozzles included in a corresponding one of the nozzle arrays ejects ink for four dots for individual nozzle arrays. Furthermore, the printing is performed while shifting in the X direction so that the dots of each of the nozzle arrays do not overlap with one another. Moreover, a region 601 remains as a white line since ink is not ejected to the region 601 corresponding to a defective ejection nozzle. A detection mark 602 is used to have correspondences between pattern positions and nozzle portions. With this mark, the pattern positions and the corresponding nozzles which performed the printing can be specified.

Subsequently, in step S504, a condition for reading the printed pattern by the reading unit 6 described above is set. In this embodiment, one of a plurality of conditions (modes) having different reading resolutions of the reading unit 6 is selected and set. In step S504, a reading resolution the same as a nozzle resolution is set in order to detect and specify a defective nozzle on a nozzle-by-nozzle basis. In this embodiment, the nozzle resolution for each nozzle array of the recording head 2 is 600 dpi. Therefore, the reading resolution in step S504 is 600 dpi which is the same as the nozzle resolution. Note that, since the purpose to set the reading resolution is to specify a defective nozzle on a nozzle-by-nozzle basis, the resolution is not limited to this as long as a defective nozzle can be specified.

Figure 7:
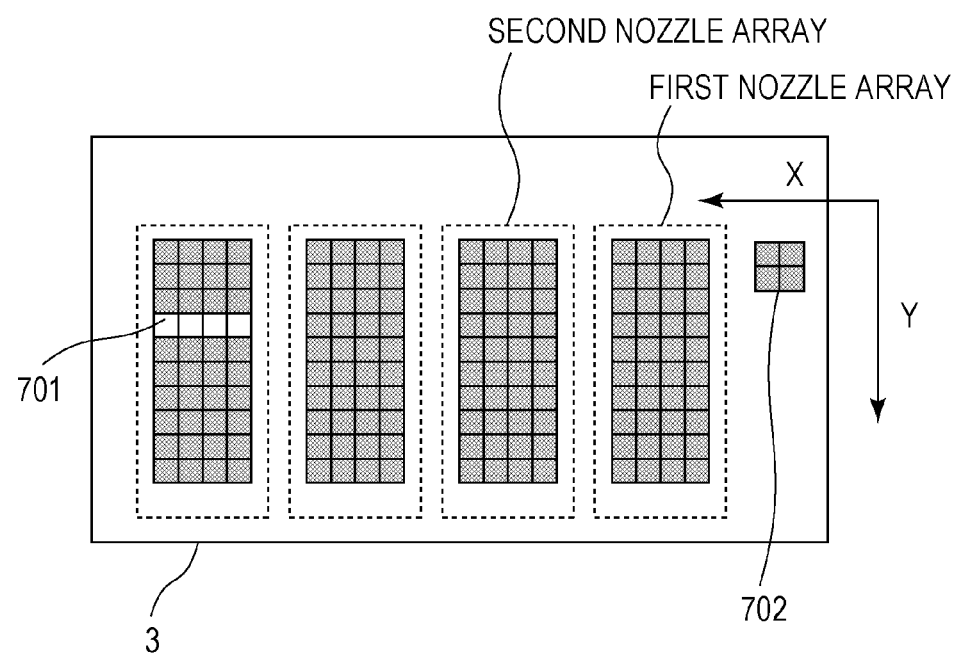
FIG. 7 is a diagram illustrating a read image of the first detection process.

Next, in step S505, the inspection pattern printed in step S503 is read in accordance with the reading condition determined in step S504. FIG. 7 is a diagram illustrating an image obtained when the pattern shown in FIG. 6 is read in a certain resolution. A region 701 corresponds to an image obtained by reading the region 601 representing the white line caused by a defective nozzle, and a region 702 corresponds to an image obtained by reading the detection mark 602. When the scanner 212 is used for the reading, the scanner 212 outputs the same signal values for individual pixels in a certain resolution. Accordingly, since the read image including pixels each of which has a square shape is obtained as shown in FIG. 7, a circle of a dot is represented by pixels each of which has a square shape.

In step S506, the inspection pattern read in step S505 is analyzed so that a defective nozzle is detected. In this process, since the nozzle resolution and the reading resolution are the same as each other, information on a defective nozzle can be obtained by simply detecting a white region and a region having color unevenness. In FIG. 7, a result of the analysis representing that a fourth nozzle included in the nozzle array 14 is a defective nozzle is obtained. In order to improve accuracy of the analysis, averaging of read images may be performed in the X direction for each nozzle array and histogram analysis may be performed in the Y direction. Any analysis method may be used as long as a defective nozzle is specified on a nozzle-by-nozzle basis.

In step S507, the information on a defective nozzle which has been analyzed in step S506 is updated. In this embodiment, the nozzle information is stored in the ROM 202. However, the nozzle information may be stored in a storage device included in the inkjet printer 210, and the information on a defective nozzle may be stored in another way.

The processes in step S501 to step S507 correspond to the first detection process performed in step S301. Since the purpose of this process is to specify a defective nozzle on a nozzle-by-nozzle basis as described above, a processing load is heavy, and accordingly, a long period of time may be required for performing the process. Therefore, the process may be performed while the maintenance is performed since there may be comparatively enough time to perform the process. Note that the first detection process may be performed before an actual image is printed or before the apparatus enters an initial state after being activated. Alternatively, the first detection process may be arbitrarily performed by the operator or the user. Since a heavy processing load is applied, the first detection process may be performed in a state in which the apparatus does not perform printing or before the apparatus has not received an instruction for printing.

Return to FIG. 3, a process in step S302 and subsequent processes will be described. In step S302, target image data is input. The target image data is stored in the storage unit 205 thorough the interface 208. In this embodiment, a resolution of the input image data is 300 dpi.

Subsequently, in step S303, printing data is generated in accordance with the target image data input in step S302. The input image data has a data format such as an sRGB, and printing data corresponding to the apparatus should be generated. Here, a printing data generation process performed by the inkjet printer 210 will be described with reference to FIG. 8.

Printing Data Generation Process

Figure 8:
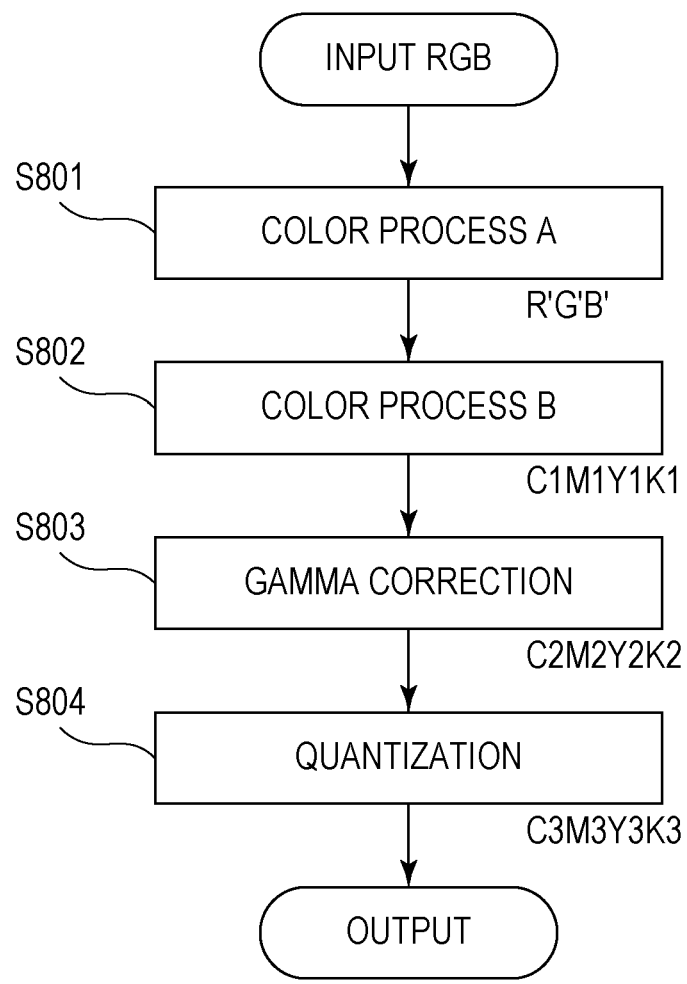
FIG. 8 is a flowchart illustrating an image process.

In FIG. 8, an original image signal of an RGB obtained by an image inputting apparatus such as a digital still camera or a scanner or obtained through a computer process is converted into an R'G'B' signal through a color process A in step S801. In the color process A, the original image signal RGB is converted into the image signal R'G'B' which is suitable for a color reproduction range of the recording apparatus. In step S802, the R'G'B' signal is converted into signals corresponding to respective color inks through a color process B. Since the four color inks are used for printing an image in this embodiment, color density signals C1, M1, Y1, and K1 corresponding to cyan, magenta, yellow, and black are obtained after the conversion. Note that, specifically, in the color process B, a three-dimensional look-up table (3DLUT) having an input of RGB and an output of CMYK is used. Here, output values corresponding to input values which are not located on grid points are obtained by performing compensation using output values of grid points located around the input values. In step S803, the color density signals C1, M1, Y1, and K1 are subjected to gamma correction using a correction table so that color density signals C2, M2, Y2, and K2 are obtained. In step S804, the color density signals C2, M2, Y2, and K2 obtained after the gamma correction are quantized (binarized) and converted into image signals C3, M3, Y3, and K3 to be transmitted to the recording head 2. Examples of a quantization method include an error diffusion method and a Dither method. A flow of a series of the processes performed when printing data is generated has been described hereinabove.

Next, in step S304, the printing data is assigned to the nozzle arrays in accordance with the printing data generated in step S303 and the information on a defective nozzle described above, and a correction process is performed. Since the four nozzle arrays correspond to the same color in this embodiment, the four nozzles eject ink for a single pixel on a surface of a sheet. However, if one of the four nozzles is a defective nozzle, the three nozzles other than the defective nozzle eject ink. Therefore, assignation of data to the nozzles is determined in accordance with the printing data and the information on a defective nozzle. In this embodiment, the assignation is sequentially performed on the three nozzles so that the three nozzles are evenly used, and accordingly, correction is performed so as not to generate an image defect due to the defective nozzle.

Note that, the method for correcting a defective nozzle is not limited to this. For example, when a recording head which has nozzle arrays corresponding to different colors are used, nozzles around a defective nozzle, for example, two nozzles which sandwich the defective nozzle or two pairs of nozzles which sandwich the defective nozzle may be used for compensation as the correction process method. Furthermore, the present invention may be applicable to a so-called multipath recording in which recording is completed after performing relative scanning several times using a recording head on a predetermined region of a recording medium. In this case, a correction process method for recording a pixel to be recorded by a defective nozzle in a certain scanning operation by a non-defective nozzle in another scanning operation so that correction is performed may be performed. The embodiment of the present invention is characterized in that the mode in which a defective nozzle is detected on a nozzle-by-nozzle basis or the mode in which a nozzle group including a defective nozzle is detected is selectively performed depending on a situation. Accordingly, the correction method is not limited to those described herein as long as a pixel to be recorded by a detected defective nozzle (or a detected defective nozzle group) is recorded by a non-defective nozzle.

Next, in step S305, ink is ejected from the recording head 2 serving as the recording unit for recording in accordance with the printing data which has been assigned to the nozzle arrays in step S304.

In step S306, it is determined whether a predetermined number of sheets have been printed. When the determination is negative, the process returns to step S302 where the target image is input whereas when the determination is affirmative, the process proceeds to step S307. In this embodiment, the number of sheets to be printed is 30 which is a fixed value. However, the number of sheets to be printed is not limited to this, and may be arbitrarily set by the operator. Furthermore, some apparatuses are capable of printing various sizes of sheets, and accordingly, a determination may be made in accordance with a period of time from when the printing is started or the number of dots obtained by counting ejection dots instead of the number of sheets to be printed.

When the determination is affirmative in step S306, a second detection process is performed in step S307. The second detection process is performed in order to detect a defective nozzle while a load applied to the process is suppressed. In the second detection process, detection of a defective nozzle is performed in a unit of a plurality of nozzles (unit of a nozzle group). A flow of the second detection process will be described with reference to a flowchart of FIG. 9.

Second Detection Process

In step S901, an inspection image is input. In this embodiment, the same inspection pattern is used in the first and second detection processes. The inspection image of the second embodiment is the same as that of the first embodiment, and therefore, a detailed description thereof is omitted.

In step S902, printing data of the inspection pattern is generated in accordance with data of the inspection image input in step S901.

Figure 10:
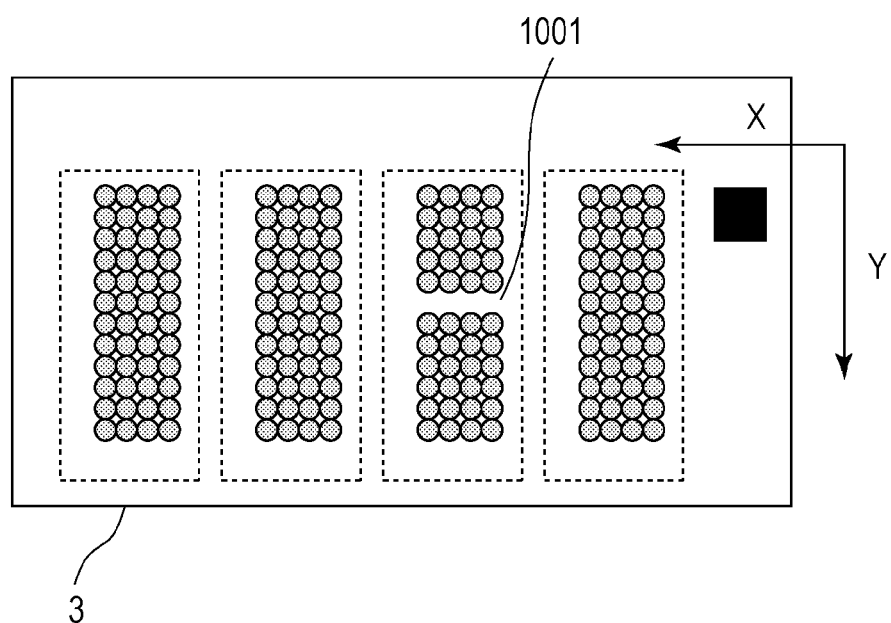
FIG. 10 is a diagram illustrating an inspection pattern of the second detection process.

In step S903, the inspection pattern is recorded in accordance with the printing data generated in step S902. FIG. 10 is a diagram illustrating the inspection pattern is printed in the second detection process.

A region 1001 represents an image defect caused by an ejection failure of a sixth nozzle of the nozzle array 12 while printing is performed on 30 sheets. Note that, in the second detection process, the inspection pattern is printed in a state in which the data has been assigned to the non-defective nozzles in accordance with the information on a defective nozzle and the correction has been performed in the first detection process, and accordingly, a white line does not appear. Accordingly, data corresponding to a position of the fourth nozzle of the nozzle array 14 in which the white line has appeared in the first detection process is printed after the data is assigned to the nozzles in the nozzle arrays 11, 12, and 13. That is, the defective nozzle detected in the first detection process has been corrected when the second detection process is performed.

Subsequently, in step S904, one of the reading conditions (reading modes) is selected and set. In this embodiment, the reading resolution is set to 300 dpi. This reading resolution is lower than the nozzle resolution (600 dpi).

Figure 11:
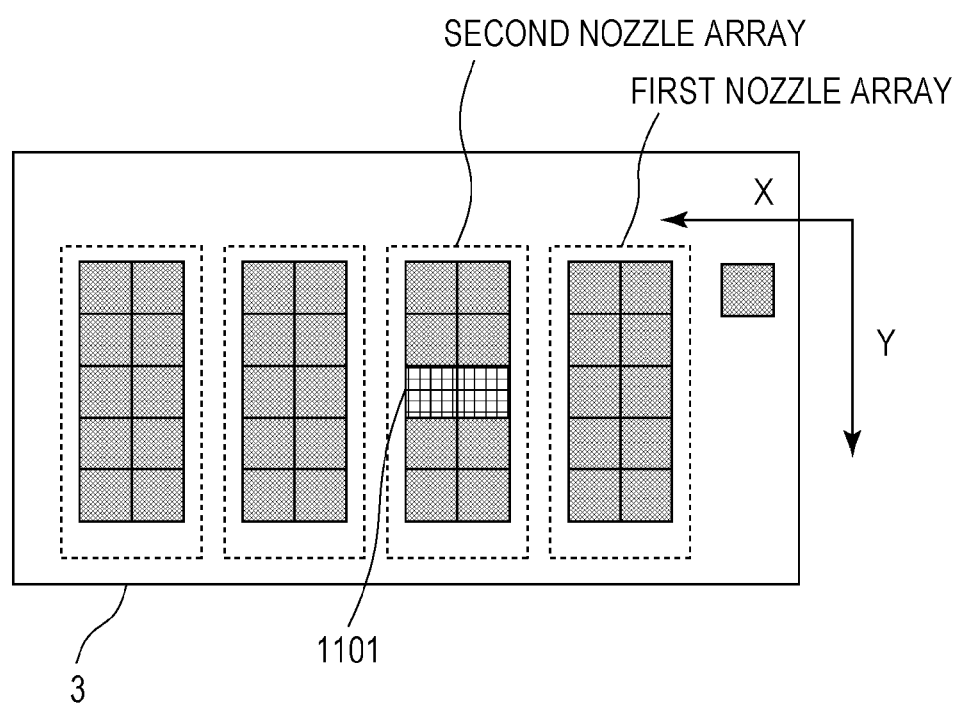
FIG. 11 is a diagram illustrating a read image of the second detection process.

Next, in step S905, the inspection pattern is read in accordance with the reading condition set in step S904. FIG. 11 is a diagram illustrating an image of the pattern shown in FIG. 10 read in a predetermined resolution. A color density of a region 1101 is reduced to half which represents that a defective nozzle is included in a plurality of nozzles which are use to record this region 1101. Here, a fact that the number of nozzles per a unit which can be identified by the reading unit 6 such as a scanner is determined in accordance with a resolution will be described with reference to FIG. 12.

Figure 12A:
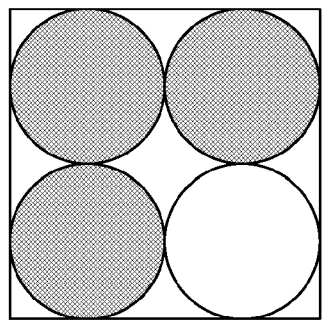
FIGS. 12A to 12C are diagrams illustrating the relationships between resolutions of reading and recording dots.
Figure 12B:
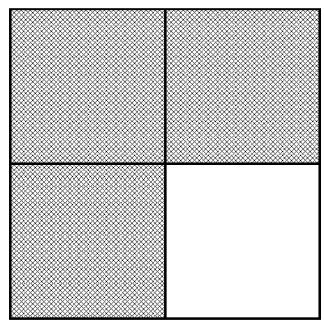
Figure 12C:
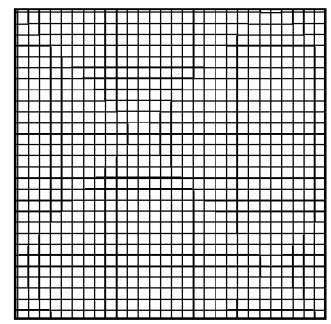

FIGS. 12A to 12C are diagrams illustrating the relationships between ink dots of the recording medium and reading pixels of the scanner. FIG. 12A shows a state in which ink is ejected to form dots in an upper left portion, an upper right portion, and a lower left portion included in a grid region of 300 dpi included in the recording medium. Since the nozzle resolution is 600 dpi, a drop of ink is landed on a grid of 600 dpi in the recording medium. That is, in a region of 300 dpi square, four ink dots can be arranged.

FIG. 12B shows an image obtained when the state shown in FIG. 12A is read with a reading resolution of 600 dpi. When the reading resolution is 600 dpi, a grid of 600 dpi corresponds to a single pixel in the reading operation. In this case, a reading image corresponding to a grid of 300 dpi includes four pixels. In the case of FIG. 12B, color densities of an upper left pixel, an upper right pixel, and a lower left pixel correspond to 1 and a color density of a lower right pixel corresponds to 0 in the reading operation.

FIG. 12C shows an image obtained when the state shown in FIG. 12A is read with a reading resolution of 300 dpi. When the reading resolution is 300 dpi, a grid of 300 dpi corresponds to a single pixel in the reading operation. Specifically, when a reading resolution is lower than a nozzle resolution, reading data corresponding to only one pixel is obtained for a plurality of dots. That is, the color densities of the three dots included in the four grids are averaged so that reading data having a color density of 0.75 is obtained. Consequently, as shown in FIG. 11, as a result of the reading operation performed on the region recorded using the nozzle group including a defective nozzle, half the color density is detected. As described above, when the reading resolution is lower than the nozzle resolution, although a determination as to whether a defective nozzle is included in a unit of a plurality of nozzles can be made, the defective nozzle is not specified.

Furthermore, in this embodiment, an ink-dot resolution in the supplying direction is the same as the nozzle resolution. However, according to the embodiment of the present invention, the relationship between the nozzle resolution and the reading resolution is important, and accordingly, the ink-dot resolution in the supplying direction is not important.

Figure 9:
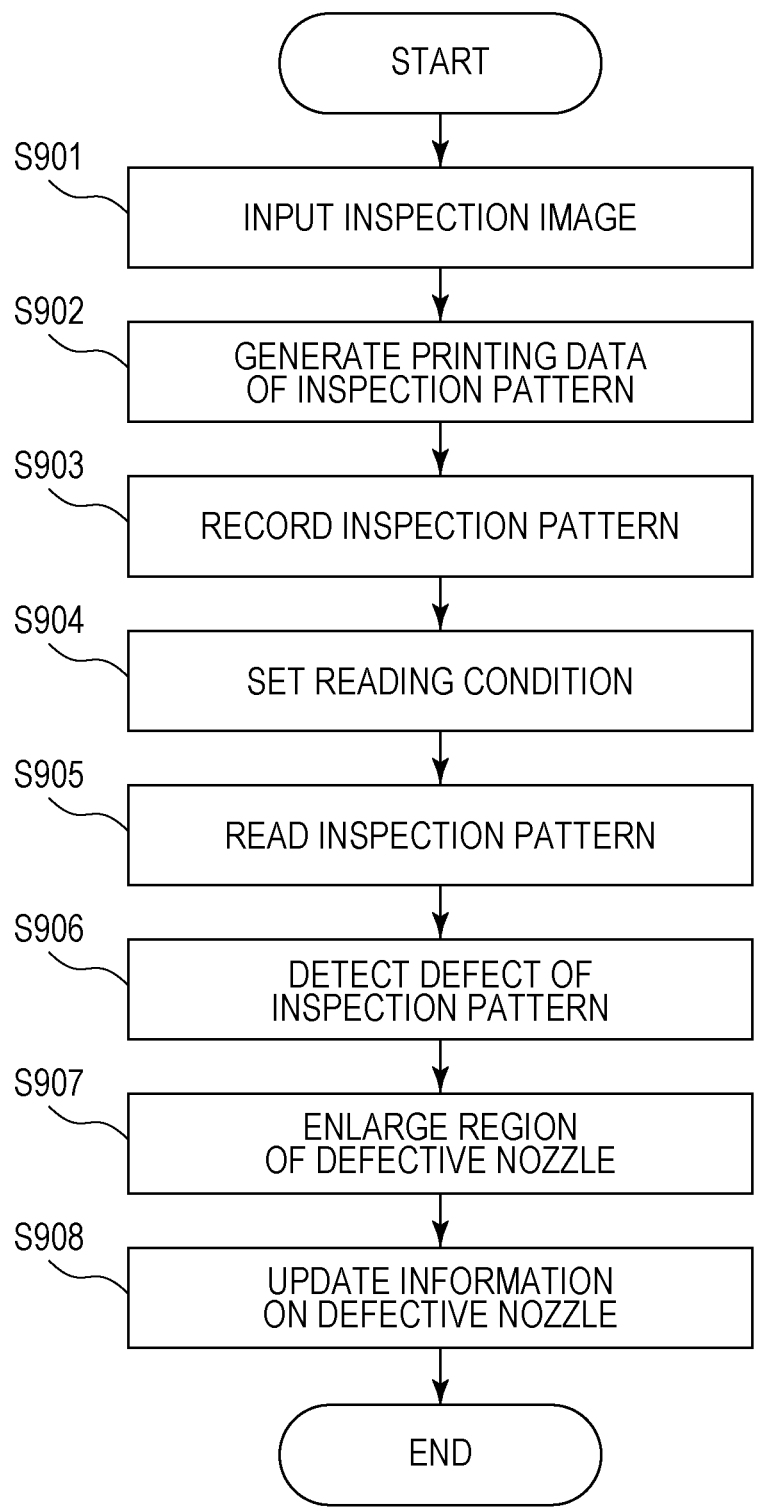
FIG. 9 is a flowchart illustrating a second detection process.

Next, in step S906 in FIG. 9, a defective nozzle is specified in accordance with the image of the inspection pattern read in step S905. Here, since it is difficult to specify a defective nozzle on a nozzle-by-nozzle basis, a region including the nozzles is determined as a unit (nozzle group) and an analysis process is performed. In this embodiment, since the reading resolution corresponds to half the nozzle resolution, a defective nozzle is specified in a unit of two nozzles. In the example shown in FIG. 10, the sixth nozzle of the nozzle array 12 corresponds to a defective nozzle. However, in the second detection process, a group including a fifth nozzle and the sixth nozzle of the nozzle array 12 is determined as a defective nozzle. Furthermore, in this embodiment, it is determined that a pixel having a color density reduced to half represents that one nozzle is defective whereas a white region represents that two nozzles are defective. Accordingly, in the analysis process, two threshold values are used for the determination. Note that in order to reliably detect a defective nozzle, a larger number of pixels may be specified. In this embodiment, third to eighth nozzles of the nozzle array 12 are determined as defective nozzles in step S907. A degree of increment of the number of pixels may be arbitrarily specified. When the number of pixels is not to be incremented, the process proceeds from step S906 to step S908.

In step S908, information on the defective nozzles determined in step S906 or step S907 is updated so that the defective nozzles are not to be used for recording. The information on the defective nozzles may be stored in a region the same as that stores information on the defective nozzle determined in the first detection process or may be stored in another region. In the second detection process, the fifth and sixth nozzles of the nozzle array 12 are determined as defective nozzles. When recording is performed afterward, a correction process is performed such that recording data is not assigned to the nozzle group determined to include the defective nozzles but assigned to the non-defective nozzles.

The processes from step S901 to step S908 are included in a processing flow of the second detection process. When a correction process is performed after the defective nozzles are detected in printing, a load applied to the processes should be reduced. As described in this embodiment, a method for reading an inspection pattern in a low resolution and performing an analysis process using a nozzle group including a plurality of nozzles as defective nozzles is employed, the defective nozzles are specified in a resolution lower than the nozzle resolution. Accordingly, processing loads are reduced and the defective nozzles are detected in printing. When the printing is consecutively performed on a plurality of sheets, the correction process is performed when the information is updated in the second detection process. Accordingly, feedback to the correction process is promptly performed.

Finally, in step S308, it is determined whether an actual image is has been printed. When the determination is negative, the process returns to step S302 where the target image is input, and the correction process and the printing operation are performed. In this case, as correction information, the nozzle information obtained in the second detection process is used for printing. As a result, a defect detection/correction process corresponding to a defective nozzle newly generated in the printing is realized with a small load.

As described above, according to the embodiment of the present invention, one of the modes corresponding to different information processing loads applied to the operation of reading the inspection pattern and the correction process is selectively executed. In this way, a defect detection/correction process suitable for various states including a state in which a correction process should be performed with high accuracy before printing and a state in which a correction process should be performed with a small load at a time of printing.

Note that, the results of the determination information processes in the first and second detection processes are stored in the same storage region in this embodiment. In this case, since a certain period of time is required for updating information on the storage region in practice, a timing of the updating of the information should be accurately controlled. Alternatively, a configuration in which a plurality of storage regions including a second storage region which is different from the storage region currently referred to may be provided and a reference destination is changed immediately after information is written to the second storage region may be added. As a result, simplification of the process is attained.

Furthermore, in this embodiment, the reading resolution of the second detection process corresponds to half the nozzle resolution, and detection of a defective nozzle is performed in a unit of two nozzles. As the reading resolution of the second detection process is lowered, an amount of information processing is reduced in an exponentiation manner. However, accuracy of the detection may be degraded. Accordingly, the reading resolution of the second detection process may be arbitrarily set depending on information processing capability of the apparatus. In this case, a system of integrally changing the number of nozzles which collectively perform the defect detection/correction process using a ratio of the reading resolution to the nozzle resolution is added. By this, an embodiment which further reduces the amount of information processing can be realized.

Moreover, although the same inspection pattern is used in the first and second detection processes in this embodiment, different inspection patterns may be used. In addition, a more desirable embodiment is realized by optimizing a pattern for each detection process.

Furthermore, although the example of the recording head having heads corresponding to different colors, each of the heads including nozzle arrays corresponding to the same color, is described in this embodiment, a recording head may have heads corresponding to different colors, each of the heads including a nozzle array for the corresponding color. As for the correction method, correction may be performed using adjacent nozzles or correction may be performed when another scanning operation is performed when the multipath recording is performed.

Moreover, although the CPU 201 serving as the controller determines the reading resolution of the reading unit in this embodiment, the present invention is not limited to this as described above. As with this embodiment, when receiving a printing job and a recording instruction, the CPU 201 may performs a reading operation in a low resolution when the recording unit starts recording, and otherwise, the CPU 201 may performs a reading operation in a high resolution. The user may select an appropriate reading resolution taking a period of time which is allowed to be consumed for a process and a processing load into consideration.

Even when a defect is detected in the second detection process, it is possible that an actual image is printed depending on a distance between the recording head and the reading apparatus and a frequency of insertion of the inspection pattern. To address this possibility, when a defect is detected in the second detection process, a process of recording an actual image printed before the inspection pattern is printed is added. By this, an embodiment which further improves usability is realized.

Second Embodiment

Next, a second embodiment of the present invention will be described. In this embodiment, first and second detection processes are performed, and when an apparatus is in a stop state, the first detection process is performed again. In the first embodiment, in order to reduce a processing load at a time of printing, a plurality of nozzles are detected as a defective nozzle group and normal nozzles in the vicinity of a defective nozzle are determined as defective nozzles and are corrected. However, in this embodiment, normal nozzles in the vicinity of a defective nozzle are determined as defective nozzles and corrected, and thereafter, detection of the defective nozzle is performed in detail on a nozzle-by-nozzle basis and a correction process is performed where appropriate after completion of printing. Note that, a basic functional configuration is the same as that of the first embodiment. However, since a determination as to whether detailed detection/correction should be performed is made at a time of termination of printing in this embodiment, a plurality of nozzle information storage units are provided.

Figure 13:
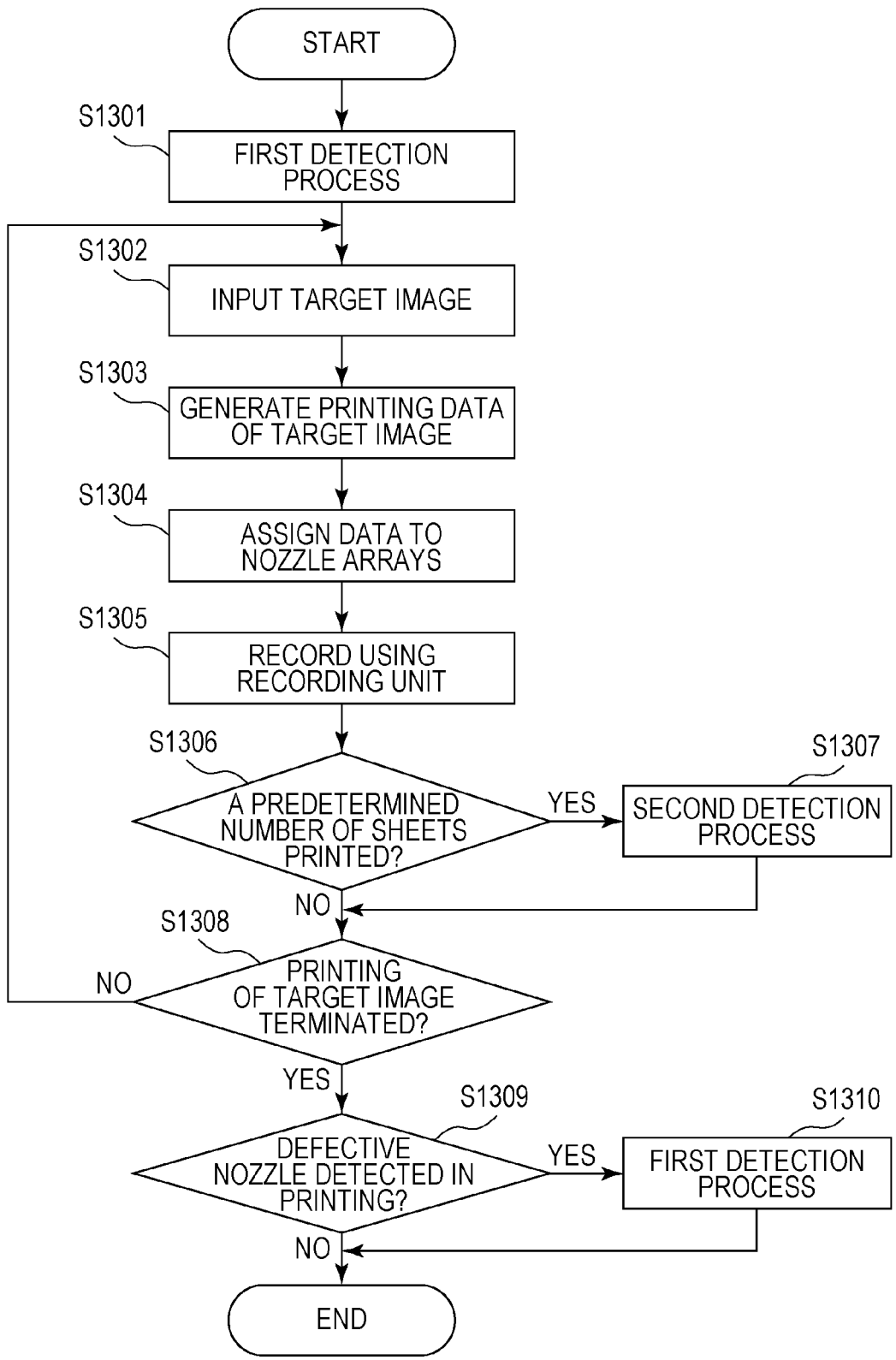
FIG. 13 is a flowchart illustrating a process according to a second embodiment.

FIG. 13 is a flowchart illustrating the process according to this embodiment. In step S1301, the first detection process is performed before printing in order to detect a defective. The process performed in step S1301 is the same as that performed in step S301, and therefore, a detailed description thereof is omitted. Note that a region to store information on a nozzle determined as a defective nozzle in the first detection process is determined as a first nozzle information storage unit, and the information is written to the first nozzle information storage unit. Processes performed in step S1302 to step S1306 are the same as those performed in step S302 to step S306 in the first embodiment, and therefore, detailed descriptions thereof are omitted. In step S1307, the second detection process is performed. Information on a result of the second detection process is stored in a second nozzle information storage unit. Here, a printing operation is consecutively performed several times, and in a case where a sequence in which the second detection process is performed again, the information on a result of the second detection process is updated where appropriate. In step S1308, it is determined whether the printing is terminated. In step S1309, it is determined whether a defective nozzle is newly generated in printing. This determination may be made by comparing the information stored in the first nozzle state storage unit which has stored the state before the printing with the information stored in the second nozzle state storage unit which stores the latest state of the apparatus. When the determination is affirmative in step S1309, the first detection process is performed again in step S1310.

As described above, since the first detection process is performed again after the printing, the normal nozzles which have been determined as the defective nozzles and therefore subjected to the correction process are used as the normal nozzles. Accordingly, even in a configuration in which the second detection process is performed while the printing is performed, the number of nozzles to be corrected can be reduced after printing and normal nozzles can be efficiently utilized.

Furthermore, in each of the first and second detection processes, a system for interrupting the process depending on a result of detection may be added. For example, when it is determined that all four nozzle arrays include defective nozzles, the process should be interrupted. In this case, an UI (User Interface) may be added to display information on a fatal error for an operator. By this, more efficient embodiment can be realized. Moreover, when an error determination process is to be performed, a process of automatically suspending a printing job to be performed, performing a suction recovery process of the apparatus, and automatically performing the first detection process may be added. As a result, a printing apparatus having more excellent usability for the operator can be configured. Note that a condition for stopping the apparatus may be arbitrarily set by the user.

Furthermore, when the apparatus is stopped while the second detection process is performed and the printing is performed, only a recording head or a tip of an ink color which has been determined to be defective may be changed. In this case, recording heads of ink colors which have not been determined as defective are not required to be subjected to the first detection process again. Accordingly, only the recording head or the tip determined to be defective may be subjected to the first detection process. As a result, a process of performing the first detection process on the normal nozzles of the ink colors can be reduced.

In the foregoing embodiments, the recording apparatus which records an image in a recording medium has been described. However, a recording system including a recording apparatus and a supplying apparatus which supplies image data to the recording apparatus may be used. In this case, reading and generating of the data may be performed any of the recording apparatus and the supplying apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording apparatus which records an image on a recording medium using a recording unit including recording element arrays, wherein each recording element array has a plurality of recording elements which is arranged, the recording apparatus comprising:

an obtaining unit configured to obtain, in a case where the recording apparatus performs a maintenance operation of the recording unit before recording an image based on a recording job, a first result of reading a first inspection pattern for detecting a defective recording element with a first resolution, and to obtain, in a case where a number of recording mediums, which have a recorded image, is larger than a predetermined number in recording the image based on the recording job, a second result of reading a second inspection pattern for detecting a recording element group including the defective recording element with a second resolution which is lower than the first resolution;

a determination unit configured to determine the defective recording element from among the plurality of recording elements based on the obtained first result, and to determine a defective recording element group from among a plurality of recording element groups based on the obtained second result; and an assigning unit configured to assign data for recording image to be assigned to the defective recording element determined by the determination unit to at least one of the plurality of recording elements other than the defective recording element, and to assign data for recording image to be assigned to the defective recording element group determined by the determination unit to the recording elements other than the recording elements included in the defective recording element group.

2. The recording apparatus according to claim 1, wherein the obtaining unit obtains the first result based on a direction about performing the maintenance operation by a user.

3. The recording apparatus according to claim 1, further comprising a reading unit configured to read the first inspection pattern and the second inspection pattern.

4. The recording apparatus according to claim 1, further comprising an inspection pattern recording unit configured to record the first inspection pattern and the second inspection pattern.

5. The recording apparatus according to claim 4, further comprising a conveying unit configured to convey the recording medium in a conveying direction, wherein the inspection pattern recording unit records the second inspection pattern at a position between images in the conveying direction.

6. A recording apparatus which records an image on a recording medium using a recording unit including recording element arrays, wherein each recording element array has a plurality of recording elements which is arranged, the recording apparatus comprising:

an obtaining unit configured to obtain, in a case where the recording apparatus performs a maintenance operation of the recording unit before recording an image based on a recording job, a first result of reading a first inspection pattern for detecting a defective recording element, and to obtain, in a case where a number of recording mediums, which have a recorded image, is larger than a predetermined number in recording the image based on the recording job, a second result of reading a second inspection pattern, wherein the second inspection pattern is different from the first inspection pattern and is for detecting a recording element group including the defective recording element;

a determination unit configured to determine the defective recording element from among the plurality of recording elements based on the obtained first result, and to determine a defective recording element group from among a plurality of recording element groups based on the obtained second result; and an assigning unit configured to assign data for recording image to be assigned to the defective recording element determined by the determination unit to at least one of the plurality of recording elements other than the defective recording element, and to assign data for recording image to be assigned to the defective recording element group determined by the determination unit to the recording elements other than the recording elements included in the defective recording element group.

7. The recording apparatus according to claim 6, wherein the obtaining unit obtains the first result based on a direction about performing the maintenance operation by a user.

8. The recording apparatus according to claim 6, further comprising a reading unit configured to read the first inspection pattern and the second inspection pattern.

9. The recording apparatus according to claim 6, further comprising an inspection pattern recording unit configured to record the first inspection pattern and the second inspection pattern.

10. The recording apparatus according to claim 9, further comprising a conveying unit configured to convey the recording medium in a conveying direction, wherein the inspection pattern recording unit records the second inspection pattern at a position between images in the conveying direction.

11. A recording apparatus which records an image on a recording medium using a recording unit including recording element arrays, wherein each recording element array has a plurality of recording elements which is arranged, the recording apparatus comprising:

a determination unit configured to determine a defective recording element from among the plurality of recording elements in a first case that the recording apparatus performs a maintenance operation of the recording unit before recording an image based on a recording job, and to determine a defective recording element group from among a plurality of recording element groups in a second case that a number of recording mediums, which have a recorded image, is larger than a predetermined number in recording the image based on the recording job; and an assigning unit configured to assign data for recording image to be assigned to the defective recording element determined by the determination unit, in the first case, to at least one of the plurality of recording elements other than the defective recording element, and to assign data for recording image to be assigned to the defective recording element group determined by the determination unit, in the second case, to the recording elements other than the recording elements included in the defective recording element group.

* * * * *